3,355,139
SOLENOID CONTROLLED VALVE
MECHANISM
Stephen F. Kittredge, 78 Smith St.,
South Portland, Maine 04101
Filed Oct. 11, 1965, Ser. No. 494,446
10 Claims. (Cl. 251—30)

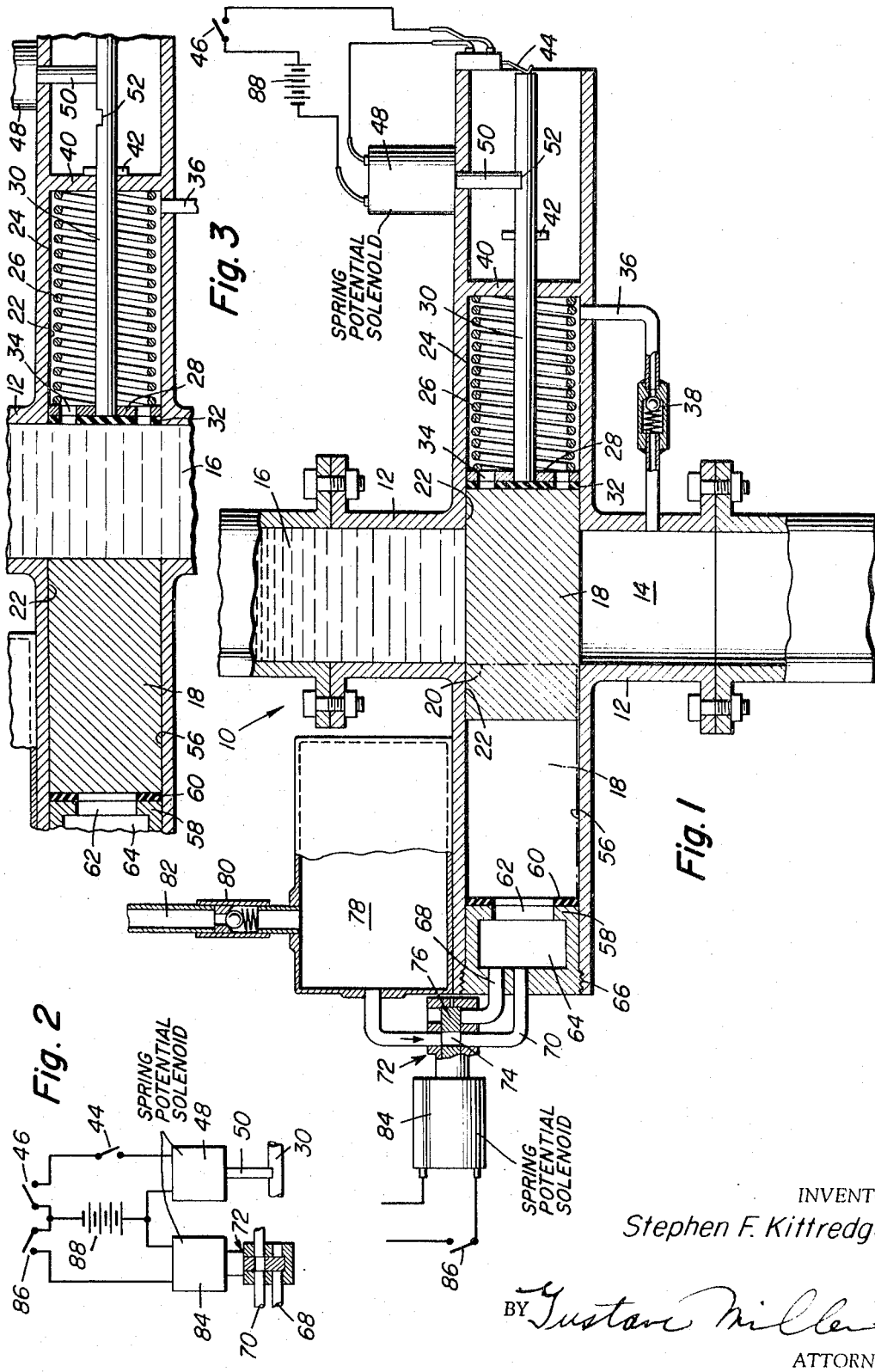

ABSTRACT OF THE DISCLOSURE

This gate valve mechanism includes a valve body having a through passageway, and a gate valve track extending transversely of the passageway, with a gate valve moveable in the track between open and closed position by fluid pressure means in one direction, and spring means in the other direction, and spring potential solenoids which are controlled by manual spring actuated switches, which switches may be remotely located, for opening or closing the gate valve. In addition, a limit switch, in series with the manual switches of the spring pressure means solenoid is provided for cooperation with the gate valve spring means, and this solenoid may be hooked up to either hold or release this spring pressure means, while the spring potential of this solenoid serves to either release or hold the spring pressure means. The spring pressure means includes a piston and piston rod confining the spring means within one end of the track short of the through passageway, and the armature of the cooperating solenoid provides a latch pin cooperating with a latch keeper recess in the piston rod for holding the spring compressed, and the gate valve closed, until it is unlatched to fire or project the gate to the other end of the track, while the passageway remains free of any obstruction.

---

This invention relates to a solenoid controlled valve mechanism, and has for an object to provide a valve mechanism, wherein a gate valve may be opened and closed by remote control, using fluid pressure in one direction, such as the closing direction, and using spring pressure in the other direction, and providing spring potential solenoids for controlling the application of both the fluid pressure and the spring pressure, wherein the controlling switches for the solenoids may be located either nearby, or at a remote location, if desirable.

A further object of this invention is to provide a valve mechanism for fluids, such as gas or oil or other liquids, both commercially and domestically, as desired.

A further object of this invention is to provide a solenoid controlled valve mechanism utilizing spring potential solenoids, i.e., a solenoid wherein the armature is magnetically actuated in one direction, and spring actuated in the opposite direction, for utilizing fluid pressure to move a gate valve in one direction, and utilizing spring pressure to move the gate valve in the opposite direction.

With the above and related objects in view, this invention consists in the details of construction and combinations of parts, as will be more fully understood from the following description, when read in conjunction with the accompanying drawing, in which:

FIG. 1 is a partly sectional and partly elevational view of the valve mechanism of this invention.

FIG. 2 is a schematic circuit diagram.

FIG. 3 is a sectional view of the valve mechanism in valve open position.

There is shown at 10 the valve mechanism of this invention. This mechanism includes a valve body 12 having a through passageway 14 through which the flow of fluid 16, liquid or gaseous, is controlled by a gate valve 18 moveable between a closed position, as shown in full and an open position, as shown in dash outline at 20, in a gate valve track 22 extending transversely of the through passageway 14.

At one end of the gate valve track 22 there is a spring means chamber 24 in which is held a compression spring 26 confined by a piston 28 and a piston rod 30. The piston 28 is provided with a valve contacting cushion 32 of rubber or other suitable material, and both cushion 32 and piston 28 may have fluid pressure releasing apertures 34 leading to the chamber 24, and fluid release conduit 36 having a one way check valve 38, leads back to the through passageway 14.

The piston rod 30 extends through the chamber end wall 40 and is provided with stop bosses 42, which, when the spring 26 is expanded, confine the piston 28 and the cushion 32 short of the through passageway 14, thus leaving the passageway 14 unobstructed when the valve 18 is in open position 20. When valve 18 is closed, piston rod 30 abuts a limit switch 44 with its end, which also limits the movement of the rod 30 and thus the valve 18 to the proper closed position as shown. This limit switch 44 is in series with a manually controlled spring switch 46 to a spring potential solenoid 48 whose armature is a latch pin 50 cooperating with a latch keeper recess 52 in the piston rod 30. The spring potential solenoid 48 has an armature actuating spring therewithin (not shown) for operating the armature latch pin 50 in one direction, while the solenoid 48 operates the armature latch pin in the other direction.

If solenoid 48 is set up to magnetically actuate the armature latch pin 50 to latching position, then the manual spring switch 46 is normally in closed position and when the valve 18 is moved to closed position, as later described, piston rod 30 hits the limit switch 44, which is normally open, to close it and thus cause solenoid 48 to actuate pin 50 to the latching position shown.

To open the valve 18 to position 20, manual switch 46 is momentarily opened, permitting the spring within the solenoid 48 to retract the latch pin 50 from the latch keeper recess 52, so that spring 26 may then "fire" or project the free floating valve 18 to the open position 20. The stops 42 cooperating with wall 40, prevent the piston head 28 and cushion 32 from entering passageway 14.

If the solenoid 48 is set up to magnetically retract the armature latch pin 50 from latching position, then the spring therewithin is set to move the latch pin 50 to latching position, the pin 50 riding on the rod 30 when not retracted. In this case, the manual spring switch 46 is also normally closed and the limit switch 44 is normally open while pin 50 rides on rod 30 and enters latch keeper recess 52 when the piston rod 30 is moved, by the closing valve 18, until the end of rod 30 abuts the limit switch to close it. With the manual switch 46 still in open position, the valve 18 remains closed. To open valve 18 to open position 20, manual spring switch 46 is then momentarily closed, retracting latch pin 50 from recess 52, to ride on rod 30 letting spring 26 close the valve 18. This opens limit switch 44 again, and with manual spring switch 46 then closed, it is set up for the spring in solenoid 48 to move latch pin 50 into recess 52 next time the valve 18 is closed.

To close the gate valve from open position 20 to closed position 18, the other end of track 22 is provided with a pressure chamber 56 ending in stop wall 58 provided with a rubber cushion 60 and a pressure opening 62 leading to a subchamber 64, which may be threaded therein at 66 as shown. Leading from the subchamber 64 is a pressure release conduit 68 and a pressure supply conduit 70, both conduits 68 and 70 leading through a spring potential armature valve means 72 having a valve opening 74 and a valve block 76. In the position shown in FIG. 1, valve opening 74 connects pressure conduit 70 to any suitable pressure supply source, such as a pressure storage chamber 78 connected through a check valve 80 and conduit 82 to an air compressor (not shown). At the same time valve block 76 closes off pressure release conduit 68. In such position, armature valve means 72 provides pressure in chamber 56 forcing open valve 20 to closed valve position 18 as shown in solid lines, compressing compression spring 26 and storing energy therein for opening the valve 18 as above described.

Solenoid armature 72 is extended by spring potential solenoid 84 against retracting spring therewithin (not shown) and is controlled by manually actuated spring switch 86, normally open, which stays closed only while manually depressed. Pressing the switch 86 extends the armature valve means 72 to the position shown, causing pressure from supply chamber 78 to enter valve actuating pressure chamber 56 and move the open valve 20 to closed valve position 18. Releasing the switch 86 opens the circuit to switch 86, letting the spring within the solenoid 84 retract the armature valve means 72 thus moving valve block 76 to open pressure release conduit 68 and close pressure supply conduit 70, letting the pressure escape from chamber 56 behind closed valve 14, where it is no longer needed once latch pin 50 has latched into recess 52 in piston rod 30.

Thus, as set forth, manual switch 86, when actuated, causes gate valve 18 to be moved to the closed position shown at 18, and when manual switch 86 is actuated, latch pin 50 is retracted, at least momentarily, permitting spring 26 to project the gate valve 18 to the open position at 20. Obviously, any suitable electricity source, such as a battery 88, or other source, is used to power the solenoids 58 and 84.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A solenoid controlled valve mechanism comprising a valve body having a through passageway, a free floating gate valve, a gate valve track extending transversely of said valve body through said passageway, a compression spring biased at one end of said gate track, a piston and piston rod confining the expansion of said compression spring short of said through passageway, a spring potential solenoid having an armature latch pin cooperating with said piston rod for holding said compression spring in compressed condition, a limit switch and a manually controllable switch in series therewith to said solenoid, said limit switch being in the path of said piston rod for actuation thereby when said gate valve is in closed position and said compression spring is compressed, a pressure chamber provided by the other end of said gate track, gate valve stop means in said pressure chamber, a pressure supply conduit to said pressure chamber, a presusre release conduit from said pressure chamber, and spring potential solenoid and solenoid armature valve means for controlling pressure through said pressure conduits to and from said pressure chamber, whereby actuation of said pressure controlling solenoid and solenoid armature valve means in one direction admits fluid pressure to said pressure chamber behind said gate valve to move said gate valve to valve body through passageway closed position compressing said compression spring and moving said piston rod to limit switch actuating position and, in the other direction, releasing the pressure from said pressure chamber, said spring potential solenoid and solenoid latch armature pin being moved to piston rod holding position, and whereby actuation of said armature latch pin spring potential solenoid, when said gate valve is in closed position, and said gate track pressure chamber has been opened, withdraws said solenoid armature latch pin from piston rod holding position, permitting said compression spring to project said gate valve to open position within said gate track pressure chamber.

2. The valve mechanism of claim 1, said spring potential solenoid armature latch pin being magnetically solenoid actuated to rod holding position when said limit switch is rod actuated to closed position while its manually operable switch is in closed position, and spring actuated to withdrawn position when its said manually operable switch is opened.

3. The valve mechanism of claim 1, said spring potential solenoid armature latch pin being spring operated to rod holding position, and solenoid magnetically actuated to withdrawn position when said manually operable switch is closed while said limit switch is in closed position.

4. The valve mechanism of claim 1, and a pressure supply storage chamber, said pressure supply conduit connecting said storage chamber through said spring potential armature valve means to said gate track pressure chamber.

5. The valve mechanism of claim 1, said piston rod and said gate track having cooperating stop means limiting the movement of said piston rod in compression spring expanding direction.

6. The valve mechanism of claim 1, and valve cushion means on said piston and on said gate valve stop means in said pressure chamber.

7. The valve mechanism of claim 1, and fluid release conduit means from said gate track compression spring chamber to said valve body through passageway.

8. The valve mechanism of claim 7, and check valve means in said fluid release conduit means.

9. In a valve mechanism, a valve body having a through passageway, a free floating gate valve, a gate valve track extending transversely of said valve body through passageway, valve opening means comprising a compression spring biased between one end of said gate track and an end of said free floating gate valve, means limiting the expansion of said compression spring short of said through passageway, and spring potential solenoid means holding said spring in compressed condition for releasing it to expand and activate said free floating valve to the other end of said gate track to valve open position, and valve closing means comprising a fluid pressure chamber provided at the other end of said gate valve track of a size and shape to receive said gate valve when in valve open position, a fluid pressure supply conduit leading to said pressure chamber, a fluid pressure release conduit leading from said gate track chamber, a spring potential solenoid and solenoid armature fluid pressure valve means, said fluid pressure valve means intercepting both said pressure supply and pressure release conduit, pressure valve means alternately providing a passageway through either pressure conduit while simultaneously closing the other pressure conduit, said solenoid armature valve means being spring operated in one direction and solenoid operated in the other direction.

10. In a valve mechanism, a valve body having a through passageway, a free floating gate valve, a gate valve track extending transversely of said valve body through passageway, and valve opening means comprising a compression spring biased at one end of said gate track, a piston and piston rod confining the expansion of said compression spring short of said through passageway, stop means on said piston rod cooperating with stop means in said gate track limiting the spring expanding movement of said piston rod, a spring potential solenoid having an armature pistod rod latching pin cooperating with a keeper recess in said rod for holding said compression pin in compressed condition, and a manually controllable switch and a limit switch in series therewith to said solenoid, said limit switch being in the path of said piston rod for actuation thereby when said gate valve is in closed position and said compression spring is fully compressed, the spring means in said spring potential solenoid operating said armature latching pin in one direction, said solenoid magnetically operating said armature latching pin in the other direction when both series switches are closed.

References Cited

UNITED STATES PATENTS

| 1,039,340 | 9/1912 | Weitzel | 251—326 |
| 1,051,768 | 1/1913 | Rumold | 251—30 X |
| 2,612,906 | 10/1952 | Shafer | 251—30 |
| 2,910,079 | 10/1959 | Beeghly | 251—68 X |

M. CARY NELSON, *Primary Examiner.*

A. ROSENTHAL, *Assistant Examiner.*